(12) United States Patent
Itoh

(10) Patent No.: US 7,532,341 B2
(45) Date of Patent: May 12, 2009

(54) FACSIMILE APPARATUS, PROGRAM, AND STORAGE MEDIUM

(75) Inventor: Nobuhiro Itoh, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 1060 days.

(21) Appl. No.: 10/463,082

(22) Filed: Jun. 17, 2003

(65) Prior Publication Data

US 2004/0001212 A1 Jan. 1, 2004

(30) Foreign Application Priority Data

Jun. 27, 2002 (JP) ............................. 2002-187710

(51) Int. Cl.
*H04N 1/46* (2006.01)
(52) U.S. Cl. .................. 358/1.15; 358/537; 358/1.9
(58) Field of Classification Search ....... 358/1.11–1.18, 358/1.1–1.9, 537, 442
See application file for complete search history.

(56) References Cited

U.S. PATENT DOCUMENTS 6,611,355 B1 * 8/2003 Kizawa ...................... 358/1.9
6,995,854 B1 * 2/2006 Murakoshi ................. 358/1.15

FOREIGN PATENT DOCUMENTS

| JP | 5-50662 | | 3/1993 |
| JP | 07-046417 | * | 2/1995 |
| JP | 8-191378 | | 7/1996 |
| JP | 11252342 | | 9/1999 |
| JP | 2000-278458 | | 10/2000 |
| JP | 2001094757 A | * | 4/2001 |
| JP | 2001-223904 | | 8/2001 |
| JP | 2001-326783 | | 11/2001 |

OTHER PUBLICATIONS

U.S. Appl. No. 10/217,322, filed Aug. 12, 2002.
U.S. Appl. No. 10/054,147, filed Jan. 21, 2002.
Jul. 3, 2007 Japanese official action in connection with Japanese Patent Application No. 2002-187710.

* cited by examiner

*Primary Examiner*—King Y Poon
*Assistant Examiner*—Lennin R Rodriguez
(74) *Attorney, Agent, or Firm*—Cooper & Dunham, LLP

(57) ABSTRACT

A facsimile apparatus is provided that prints image information with a designated printing color (such as magenta) stored in a designated calling-party printing color storage unit in an operation of receiving a document from a designated calling party that has been registered beforehand in association with the designated printing color. Such a document printed with the designated printing color can be clearly distinguished from a document that is printed with a default printing color (such as black) for an undesignated calling party.

21 Claims, 10 Drawing Sheets

FIG.3

| REGISTERED DESTINATION | CALLING-PARTY INFORMATION | DESIGNATED PRINTING COLOR |
|---|---|---|
| AA CORPORATION | 03-1234-5678 | MAGENTA |
| BB COMPANY | 03-8765-4321 | CYAN |

FIG.6

| REGISTERED CALLING PARTY | CALLING-PARTY INFORMATION | DESIGNATED PRINTING COLOR | DESIGNATED SUBSTITUTE PRINTING COLOR | SUBSTITUTE COLOR MARK |
|---|---|---|---|---|
| AA CORPORATION | 03-1234-5678 | MAGENTA | BLACK | ON |
| BB COMPANY | 03-8765-4321 | CYAN | OFF | OFF |

FIG.7

○ ● ← SUBSTITUTE COLOR
DESIGNATED COLOR

FAX COVER LETTER

JUNE 15, 2002

XYZ CORPORATION
PATENT DIVISION
MR. JOHN SMITH

AA CORPORATION
FROM: TARO TOKKYO
SHIBUYA, SHIBUYA-KU, TOKYO, JAPAN
Fax 03-1234-5678

We are sending herewith the following document
(10 pages, including this cover page).
Please confirm us of safe receipt by return facsimile.

REMARKS } SUBSTITUTE COLOR PRINTING

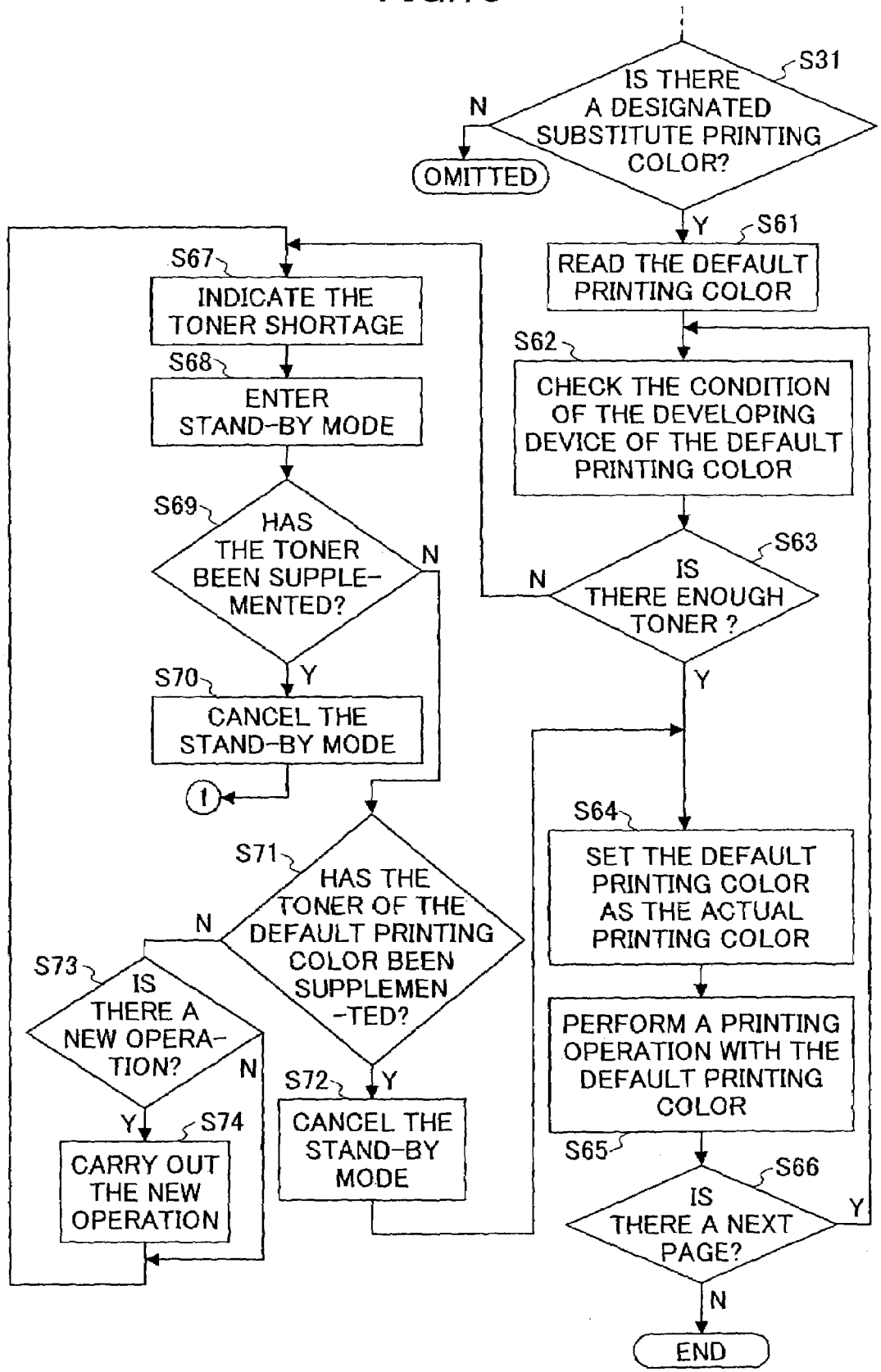

FACSIMILE APPARATUS, PROGRAM, AND STORAGE MEDIUM

BACKGROUND

1. Technical Field

This disclosure relates to a facsimile apparatus, a program, and a storage medium.

2. Description of the Related Art

In general, transmission and reception can be performed with a large number of unidentified people in facsimile communication. Some users have a requirement that facsimile reception from particular calling parties such as client companies should be clearly distinguished from facsimile reception from other calling parties. In this manner, each facsimile document received from the particular calling parties can be promptly recognized, even if there are a number of facsimile documents received from various calling parties.

In response to the above demand, a conventional facsimile apparatus is equipped with a particular paper feeding cassette, as well as a regular paper feeding cassette. When receiving image information, a paper selecting mode is set for the calling party, and the image information is accompanied by calling-party information containing a transmission terminal identifying signal TSI and a non-standard function setting signal NSS in accordance with the G3-type facsimile protocols. If the calling-party information corresponds to the particular calling-party information that has been registered beforehand, the received image information is recorded on recording paper sheets set in the particular paper feeding cassette. This type of facsimile apparatus is disclosed in Japanese Laid-Open Patent Application No. 11-252342, for example.

In the above conventional facsimile apparatus equipped with the calling-party paper feeder selecting function, yellow recording paper sheets are set in the particular paper feeding cassette, while white recording paper sheets are set in the regular paper feeding cassette, for example. In this manner, image information received from the particular calling parties can be clearly separated from image information received from other calling parties. Also, different types of recording paper sheets can be employed, instead of different color paper sheets.

In the above apparatus, however, it is necessary to prepare the particular paper feeding cassette separately from the regular paper feeding cassette. First of all, this structure cannot be applied to a facsimile apparatus that does not have more than one paper feeding cassette. Second, paper feeding cassettes in a facsimile apparatus are normally designed for feeding recording paper sheets of different sizes. Since the regular paper feeding cassette and the particular paper feeding cassette are designed for the same size of recording paper sheets, two paper feeding cassettes are required for each sheet size. This results in an increase of the apparatus size. Also, with only one particular paper feeding cassette, only one particular calling party can be distinguished, but two or more particular calling parties cannot be distinguished from one another. If a particular paper feeding cassette is employed for each of the particular calling parties, the entire size of the facsimile apparatus becomes even larger.

Furthermore, when the paper sheets set in the particular paper feeding cassette have run out, back-up reception is performed or the communication is suspended. As a result, documents received from the particular calling party cannot be output. In such a case, it is possible to switch to the regular paper feeding cassette, but there is then no difference between printing for a particular calling party and printing for an unregistered calling party. Although received documents can be printed, it is impossible to distinguish the documents received from the particular calling parties from the other documents. As a result, back-up reception is performed or the communication is suspended. In such a case, users cannot do anything but wait until the particular paper feeding cassette is supplemented with particular recording paper sheets.

SUMMARY

In an aspect of this disclosure, a facsimile apparatus is provided that can print documents in such a manner that each document received from a designated calling party can be clearly distinguished from documents received from undesignated calling parties, without depending on different types of recording paper sheets.

This disclosure also provides a program and a storage medium that are utilized in the facsimile apparatus of the present invention.

In another aspect of this disclosure, a facsimile apparatus, a program, and a storage medium are provided that can cope with a situation in which there are a plurality of designated calling parties, and users wish to distinguish the designated calling parties from one another.

In addition, a facsimile apparatus, a program, and a storage medium are provided that can cope with a situation in which printing cannot be performed due to a toner shortage.

In another aspect of this disclosure, a facsimile apparatus is provided that includes a printer that has a plurality of printing colors, a designated calling-party printing color storage unit that stores calling-party information as to designated calling parties each associated with a designated printing color different from a default printing color, a transmission origin determiner that determines whether the transmission origin of image information received in a receiving operation is one of the designated calling parties stored in the designated calling-party printing color storage unit, based on calling-party information accompanying the image information, and a designated color print control unit that causes the printer to print the image information using the corresponding designated printing color stored in the designated calling-party printing color storage unit, if the transmitter origin determiner determines that the transmission origin is one of the designated calling parties.

With this facsimile apparatus, image information received from a designated calling party that has been registered beforehand is printed by the printer using a designated printing color stored in the designated calling-party printing color storage unit. Thus, the document sent from the designated calling party can be clearly distinguished from documents printed with the default printing color for undesignated calling parties.

The above facsimile apparatus may further include a designated printing color setting unit that can set different designated printing colors for the respective designated calling parties registered in the designated calling-party printing color storage unit.

Accordingly, the designated calling parties can be easily distinguished from one another, by virtue of the different designated printing colors.

The above facsimile apparatus may further include an intermission stand-by processing unit that indicates that the printing is suspended when the printer cannot perform the printing with the corresponding designated printing color for the transmitter origin determined to be one of the designated calling parties by the transmitter origin determiner, and stands by until the printing with the designated printing color can be resumed.

With this structure, when printing with a designated printing color cannot be performed due to a shortage of the corresponding color toner, the display device of the facsimile apparatus indicates that the printing is suspended, and the apparatus stands by until the printing with the designated printing color can be resumed. In this case, the received document cannot be obtained instantly, but the document from a designated calling party can be clearly distinguished from documents received from undesignated calling parties.

The above facsimile apparatus may further include a substitute printing unit that causes the printer to print the received image information with a substitute printing color instead of the corresponding designated printing color, if the printing cannot be performed with the corresponding designated printing color for the transmitter origin that has been determined to be one of the designated calling parties by the transmitter origin determiner.

With this structure, when printing with a designated printing color cannot be performed due to a shortage of the corresponding color toner, printing can be performed with a substitute printing color instead of the designated printing color. Accordingly, print output can be reliably obtained in the second-best mode. Thus, stoppage of printing and delay of print output can be minimized.

The above facsimile apparatus may further include a substitute printing color setting unit that can set different substitute printing colors for the respective designated calling parties registered in the designated calling-party printing color storage unit.

With this structure, when printing with a designated printing color cannot be performed due to a shortage of the corresponding color toner, printing is performed with a substitute printing color set by a user, so as to obtain print output in the second best form. Thus, the requirement of the user can be optimally met.

The above facsimile apparatus may further include an automatic substitute printing color setting unit that automatically sets a substitute printing color for the transmission origin determined to be one of the designated calling parties, if the transmission origin does not have a substitute printing color set by a user.

With this structure, even if a substitute printing color has not been set by a user and printing with a designated printing color cannot be performed due to a shortage of the corresponding color toner, a substitute printing color can be automatically set to obtain the second best print output.

In the above facsimile apparatus, the automatic substitute printing color setting unit may determine which printing color agent has the greatest remaining amount among available printing agents, and may automatically set the printing color corresponding to the printing color agent having the greatest remaining amount as a substitute printing color.

With this structure, when printing with a designated printing color cannot be performed by the printer due to a shortage of the corresponding color toner, a printing color agent having the greatest remaining amount is automatically set as a substitute printing color. Accordingly, stoppage of printing with a substitute printing color can be prevented, and print output can be reliably obtained through substitute color printing.

In the above facsimile apparatus, the default printing color that has been set in an initializing process may be used as a substitute printing color, if the transmission origin determined to be one of the designated calling parties does not have a substitute printing color set by a user through the substitute printing color setting unit.

If a substitute printing color has not been set by a user in a case where printing with a designated printing color cannot be performed due to a shortage of the corresponding color toner, the default printing color is used as a substitute printing color. Thus, the most common color can be set as a substitute printing color.

The above facsimile apparatus may further include a substitute printing information adding unit that prints a substitute printing remark indicating that the printing has been performed with a substitute printing color instead of the corresponding designated printing color, when the substitute color printing unit performs substitute color printing.

If print output is performed with a substitute printing color instead of the corresponding designated printing color, users might not recognize that the received document has been sent from a designated calling party. However, with the substitute printing remark indicating that the printing has been performed with the substitute printing color instead of the designated printing color, the received document can be easily and clearly recognized as a document sent from a designated calling party.

In the above facsimile apparatus, the addition of the substitute printing remark by the substitute printing information adding unit may be optional.

If printing cannot be performed with a designated printing color due to a shortage of the corresponding color toner, some users might give priority to promptly printing output over clearly distinguishing between a designated calling party and an undesignated calling party. With the above structure, each user can have the desired print setting, and it is possible for the facsimile apparatus to optimally meet the requirements of each user.

In another aspect of this disclosure, a program that is installed in a computer provided in a facsimile apparatus that includes a printer having a plurality of printing colors and a designated calling-party printing color storage unit that stores calling-party information as to designated calling parties each associated with a designated printing color different from a default printing color. This program causes the computer to execute; a transmission origin determining function for determining whether the transmission origin of image information received in a receiving operation is one of the designated calling parties scored in the designated calling-party printing color storage unit, based on calling-party information accompanying the image information, and a designated color printing function for causing the printer to print the image information with the corresponding designated printing color stored in the designated calling-party printing color storage unit, if the transmission origin is determined to be one of the designated calling parties through the transmission origin determining function.

The above program may further cause the computer to execute a designated printing color setting function for setting different designated printing colors for the respective designated calling parties registered in the designated calling-party printing color storage unit.

The above program may further cause the computer to execute an intermission stand-by processing function for indicating that the printing with the designated printing color corresponding to the transmission origin determined to be one of the designated calling parties is suspended, and for standing by until the printing with the designated printing color can be resumed.

The above program may further cause the computer to execute a substitute color printing function for causing the printer to print the received image information with a substitute printing color instead of the corresponding designated printing color, if the printing cannot be performed with the designated printing color corresponding to the transmission origin determined to be one of the designated calling parties through the transmission origin determining function.

The above program may further cause the computer to execute a substitute printing color setting function for setting different substitute printing colors for the respective designated calling parties registered in the designated calling-party printing color storage unit.

The above program may further cause the computer to execute an automatic substitute printing color setting function for automatically setting a substitute printing color, if the transmission origin determined to be one of the designated calling parties does not have a substitute printing color set by a user.

In the above program, the automatic substitute printing color setting function may determine which printing color agent has the greatest remaining amount among available printing color agents, and may automatically set the printing color agent having the greatest remaining amount as a substitute printing color.

In the above program, the default printing color that has been set in an initialing process may be used as a substitute printing color for the transmission origin determined to be one of the designated calling parties, if the transmission origin does not have a substitute printing color set by a user through the substitute printing color setting function.

The above program may further cause the computer to execute a substitute printing information adding function for printing a substitute printing remark indicating that the printing has been performed with a substitute printing color instead of the corresponding designated printing color through the substitute color printing function.

In the above program, the addition of the substitute printing remark through the substitute printing information adding function may be optional.

In addition, a computer-readable storage medium that stores the above described program of the present invention can be provided.

In another aspect of this disclosure, a method of printing image information with a printer having a plurality of printing colors includes storing calling-party information as to designated calling parties each associated with a designated printing color different from a default printing color, determining whether the transmission origin of the image information is one of the designated calling parties stored in the designated calling-party printing color storage unit, based on calling-party information accompanying the image information received in a receiving operation, and printing the image information with the printer using the corresponding designated printing color stored in the designated calling-party printing color storage unit, if the transmission origin of the image information is determined to be one of the designated calling parties.

The above and other features and advantages of the present invention will become more apparent from the following detailed description taken in conjunction with the accompanying drawings.

BRIEF DESCRIPTION OF THE DRAWINGS

FIG. 3 illustrates a registration example of the designated calling-party printing color registration table stored in the RAM shown in FIG. 1;

FIG. 6 illustrates a registration example of the designated calling-party printing color registration table in accordance with a second embodiment of the present invention;

FIG. 7 illustrates a printing example of a substitute printing mark in accordance with the second embodiment;

FIG. 10 is a flowchart of the designated calling-party dealing process-in accordance with a third embodiment of the present invention.

DESCRIPTION OF THE PREFERRED EMBODIMENTS

Figure 1:
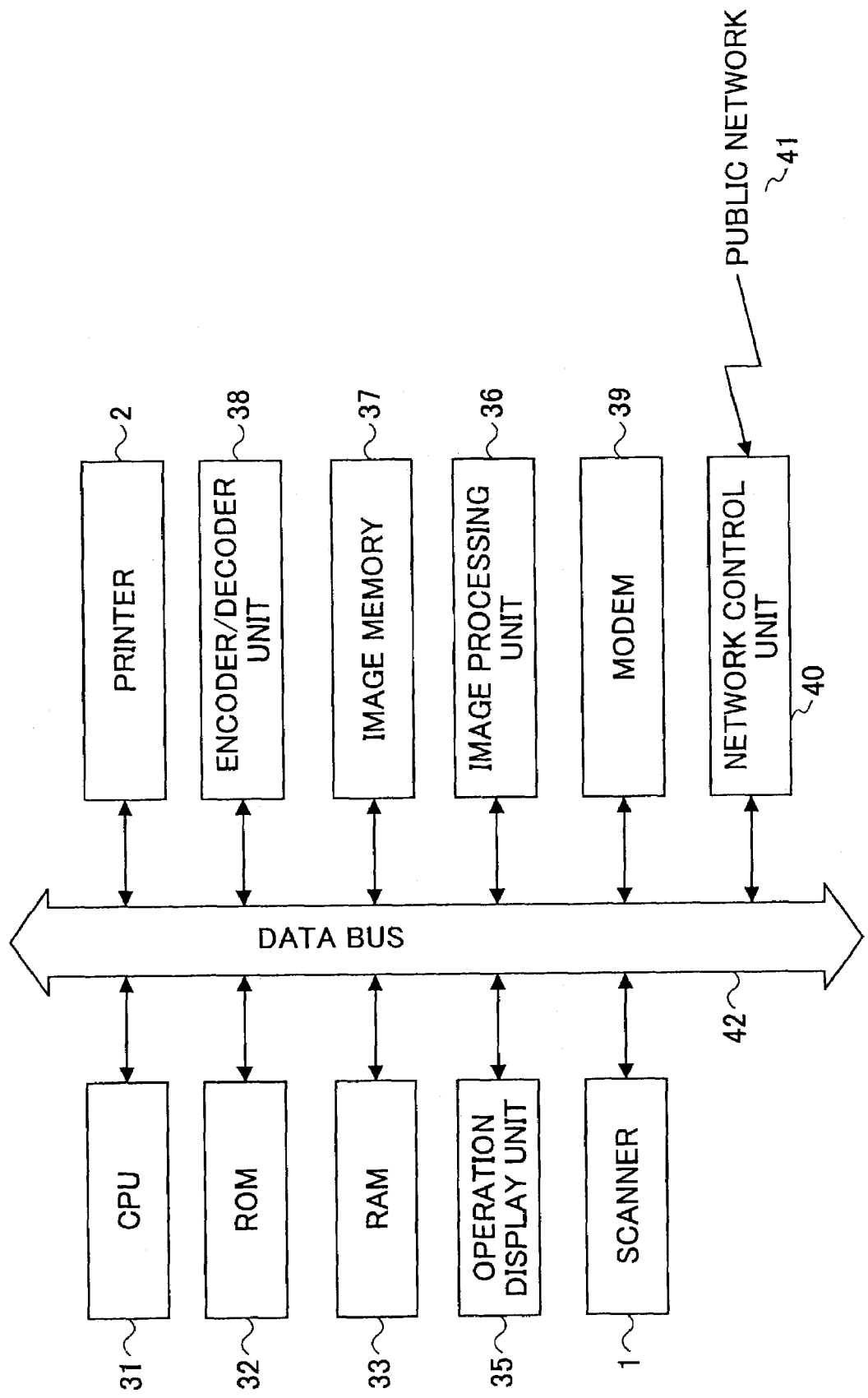
FIG. 1 is a block diagram illustrating the hardware structure of a facsimile apparatus in accordance with a first embodiment of the present invention.

Referring to FIGS. 1 through 5, a first embodiment of the present invention will be described. FIG. 1 is a block diagram illustrating the hardware structure of a facsimile apparatus (a multifunction peripheral). The facsimile apparatus of this embodiment includes a scanner 1 that reads original images with a predetermined resolution to obtain image information, and a printer 2 that prints (duplicates) the image information scanned by the scanner 1.

Figure 2:
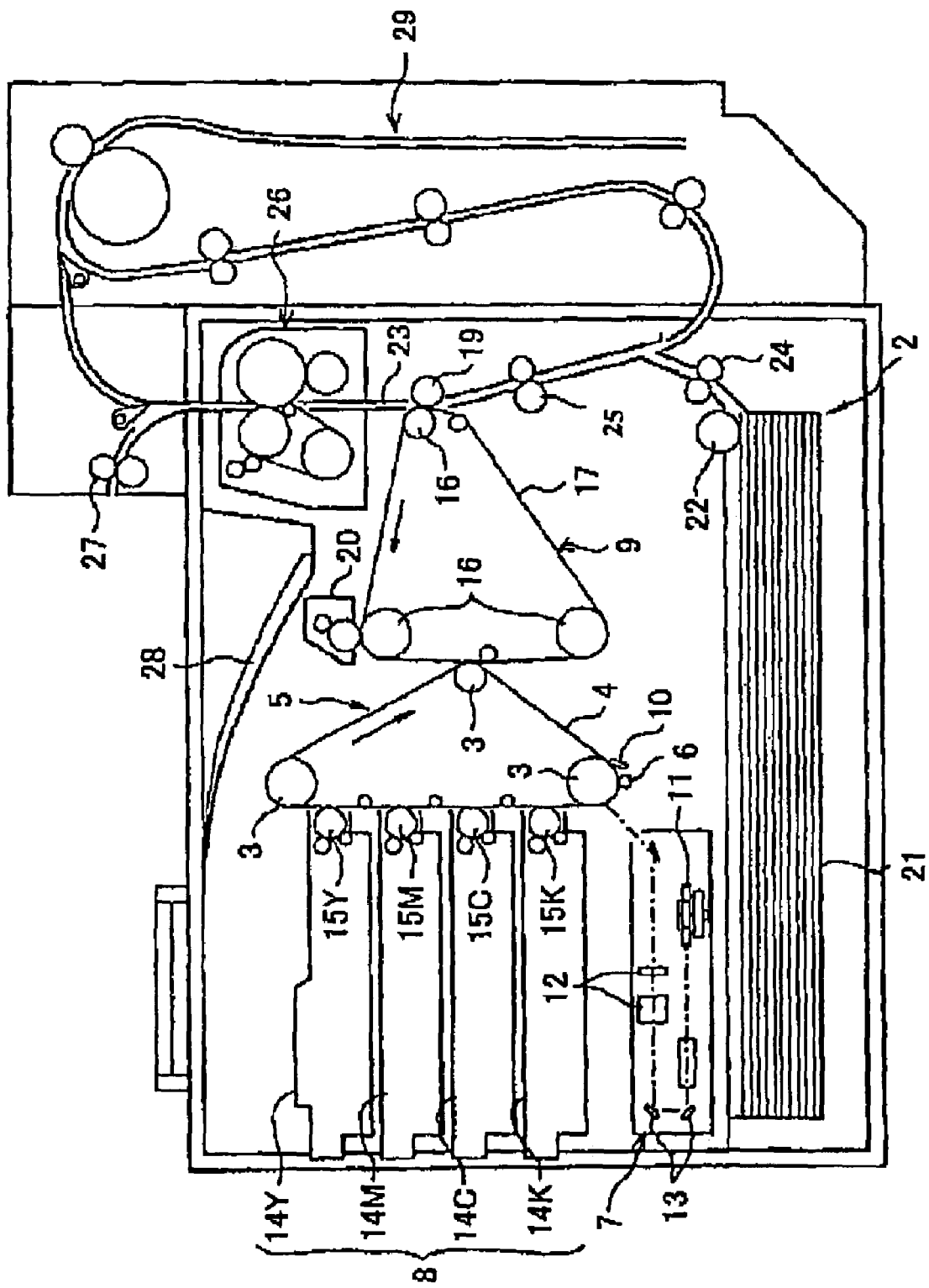
FIG. 2 is a schematic sectional view of the structure of the printer provided in the facsimile apparatus of FIG. 1.

The printer 2 of this facsimile apparatus is a color printer that can output multiple colors. More specifically, the printer 2 is a full-color laser printer that utilizes an electrophotography technique. FIG. 2 illustrates the structure of the printer 2. As can be seen from FIG. 2, a photosensitive unit 5 is provided at the center of the printer 2. This photosensitive unit 5 has an endless-belt photosensitive member 4 wound around rollers 3. The photosensitive member 4 has an organic photosensitive layer on the surface, and is surrounded by a charging unit 6, an optical writing unit 7, a developing unit 8, an intermediate transfer unit 9, and a cleaning unit 10, in accordance with an electrophotography process.

The charging unit 6 uniformly charges the surface of the photosensitive member 4 through high-voltage application. The optical writing unit 7 emits laser beams through a semiconductor layer (not shown), based on received image information or the like. The laser beams are then put through a polygon mirror 11, fθ lens 12, and mirrors 13, so that optical writing is performed in accordance with image signals of black (K), cyan (C), magenta (M), and yellow (Y). Thus, an electrostatic latent image is formed on the photosensitive member 4.

The developing unit 8 has developing devices 14K, 14C, 14M, and 14Y that store different printing toners (printing color agents) of black (K), cyan (C), magenta (M), and yellow (Y), in this order from the bottom. The developing devices 14K, 14C, 14M, and 14Y are detachable. Each of the developing devices 14K, 14C, 14M, and 14Y is selectively brought near the photosensitive member 4, so that developing sleeves 15K, 15C, 15M, and 15Y provided in the respective developing devices 14 are brought into contact with or near the photosensitive member 4. With the developing unit 8, full-color printing can be performed using three colors of cyan (C), magenta (M), and yellow (Y), as well as black (B). Furthermore, single-color printing can be performed using one of the colors. Thus, printing can be performed with a color other than black. In this embodiment, black (K) is set as the default color for printing, especially for reception via facsimile communication. Although not particularly shown, each of the developing devices 14K, 14C, 14M, and 14Y is equipped with a toner detecting sensor that detects the remaining amount of each toner. This detecting operation is realized with a below described CPU.

The intermediate transfer unit 9 includes an endless intermediate transfer belt 17 wound around rollers 16. Like the photosensitive member 4, this intermediate transfer belt 17 also has an organic photosensitive layer on the surface. An intermediate transfer roller 19 is provided on the opposite side of a sheet transfer path 23 from the intermediate transfer belt 17. A cleaning device 20 is also provided.

The cleaning unit 10 for the photosensitive member 4 is formed by a cleaning blade pressed against the photosensitive member 4.

In the printer 2, a paper feeding cassette 21 is detachably provided at the bottom. Recording paper sheets stored in the paper feeding cassette 21 are fed into a sheet transfer path 23 by virtue of the rotation of a paper feeding roller 22, and are then transferred to resist rollers 25 through transfer rollers 24. The resist rollers 25 send each recording paper sheet between the intermediate transfer belt 17 and the intermediate transfer roller 19 at predetermined timing.

A fixing unit 26 and discharging, rollers 27 are provided in this order at the downstream side of the sheet transfer path 23. A discharged sheet stacker 28 that stacks recorded sheets facing downward is provided in the upper area of the printer 2.

A double-face unit 29 is optionally provided at the sheet discharging side of the printer 2.

To perform printing with this printer 2, the photosensitive member 4 and the intermediate transfer belt 17 are rotated in the direction of the arrows in FIG. 2, and the paper feeding roller 22 is rotated to send each recording paper sheet to the resist rollers 25 through the sheet transfer path 23.

The charging unit 6 uniformly charges the surface of the photosensitive member 4. The optical writing unit 7 performs writing to form an electrostatic latent image in each color on the photosensitive member 4. The developing unit 8 then electrostatically attaches toners that are charged with the opposite polarities from the electrostatic latent images, so as to make visible the image in each color. Electric charges of the opposite polarity from the toners are applied to the visible images, so that the toner of each color is transferred onto the intermediate transfer belt 17. Thus, a color image of the four compounded colors is formed.

The intermediate transfer roller 19 applies electric charges of the opposite polarity from the toners to the color image formed on the intermediate transfer belt 17, so that the color image is transferred onto a recording paper sheet that is sent between the intermediate transfer belt 17 and the intermediate transfer roller 19 at a predetermined timing. The fixing unit 26 fixes the transferred image on the recording paper sheet, and the discharging roller 27 discharges the recording paper sheet onto the discharged sheet stacker 28.

When default reception printing is performed in a facsimile communication, only the black developing device 14K is used, with the black color being set as the default printing color. Also, single-color printing, such as cyan-color printing and magenta-color printing, can be performed using one of the developing devices 14C and 14M.

Referring back to FIG. 1, an example of the hardware structure of this embodiment will be described in greater detail. The facsimile apparatus of this embodiment is compliant with G3-type facsimile apparatuses A CPU 31, a ROM 32, and a RAM 33 constitute a microcomputer that performs various control operations for the components and the facsimile transfer procedures of the facsimile apparatus. The ROM 32 stores control programs and operation programs to be executed by the CPU 31. More specifically, the ROM 32 stores programs to realize various functions described later, and the ROM 32 serves as a storage medium of those programs. Therefore, the ROM 32 is formed by an EEPROM or a flash memory in this embodiment, and the programs stored in the ROM 32 are rewritable. Although not shown in FIG. 1, a network interface may be added to this structure, so as to download the programs via a network.

The RAM 33 functions as a work area, and temporarily stores various types of information. The RAM 33 has a backup by means of a backup circuit (not shown), so that the storage contents are maintained when the apparatus power source is shut off. As shown in FIG. 3, the RAM 33 stores a designated calling-party printing color registration table 34 in advance.

This designated calling-party printing color registration table 34 contains calling-party information (the telephone numbers of the calling parties registered in the devices of the calling parties) to be normally reported by means of transmission terminal identifying signals TSI in accordance with the G3-type facsimile protocols, and more calling-party information (the names of divisions or sections registered in the devices of the calling parties) to be optionally reported by means of non-standard function setting signals NSS between devices of the same manufacturer. The calling parties are determined by users. The designated calling-party information is reported when each designated calling party actually receives image information, and is input by a user inputting through an operation display unit 35 based on the contents output as a communication control report. Further, a designated printing color to be used as the printing color (such as magenta and cyan) for reception printing is registered for each calling party in the designated calling-party printing color registration table 34. The designated printing colors are also registered beforehand by a user inputting through the operation display unit 35. Accordingly, the designated calling-party printing color registration table 34 of this embodiment functions as designated calling-party printing color storing means that store the calling-party information as to designated calling parties each associated with a designated printing color different from the default printing color. Here, a designated printing color setting means or a designated printing color setting function that can set different designated printing colors for the calling parties is realized with the designated calling-party printing color registration table 34. It should be noted that yellow (Y) is excluded from the designated printing colors of this embodiment, since yellow is difficult to see on a white paper sheet.

The operation display unit 35 includes a ten-key panel, a start key, a one-push key panel, and other keys, as well as a display device such as a liquid crystal display. With the display device, the operation display unit 35 displays the conditions of the facsimile apparatus and various messages that users should be notified of.

An image processing unit 36 performs operations such as resolution conversion and magnification control on image information to be printed by the printer 2. An image memory 37 serves as the work area of the image processing unit 36, and temporarily stores received image information and transmission image information obtained by reading an original image with the scanner 1.

An encoder/decoder unit 38 encodes and compresses transmission image information by a predetermined encoding technique that is compatible with G3-type facsimile machines, such as a MH encoding technique, a MR encoding technique, or a MMR encoding technique. The encoder/decoder unit 38 also decodes and decompresses received image information by a predetermined decoding technique, such as a MH decoding technique, a MR decoding technique, or a MMR decoding technique.

A modem 39 is a G3-type facsimile modem that modulates data to be transmitted to a public network 41 via a network control unit 40, and also demodulates signals received from the public network 41 via the network control unit 40. The modem 39 further transmits a DTMF signal in accordance with each input telephone number. The network control unit 40 is connected to the public network 41, and performs line connection control, such as opening/closing of a line direct-current loop, detection of a polarity reversal in the line, detection of opening of the line, detection of a dial tone, detection of a tone signal such as a busy tone, and detection of a calling signal. The network control unit 40 also generates a dial pulse.

A data bus 42 to which the above components are connected is a signal line for data exchange among those components.

Figure 4:
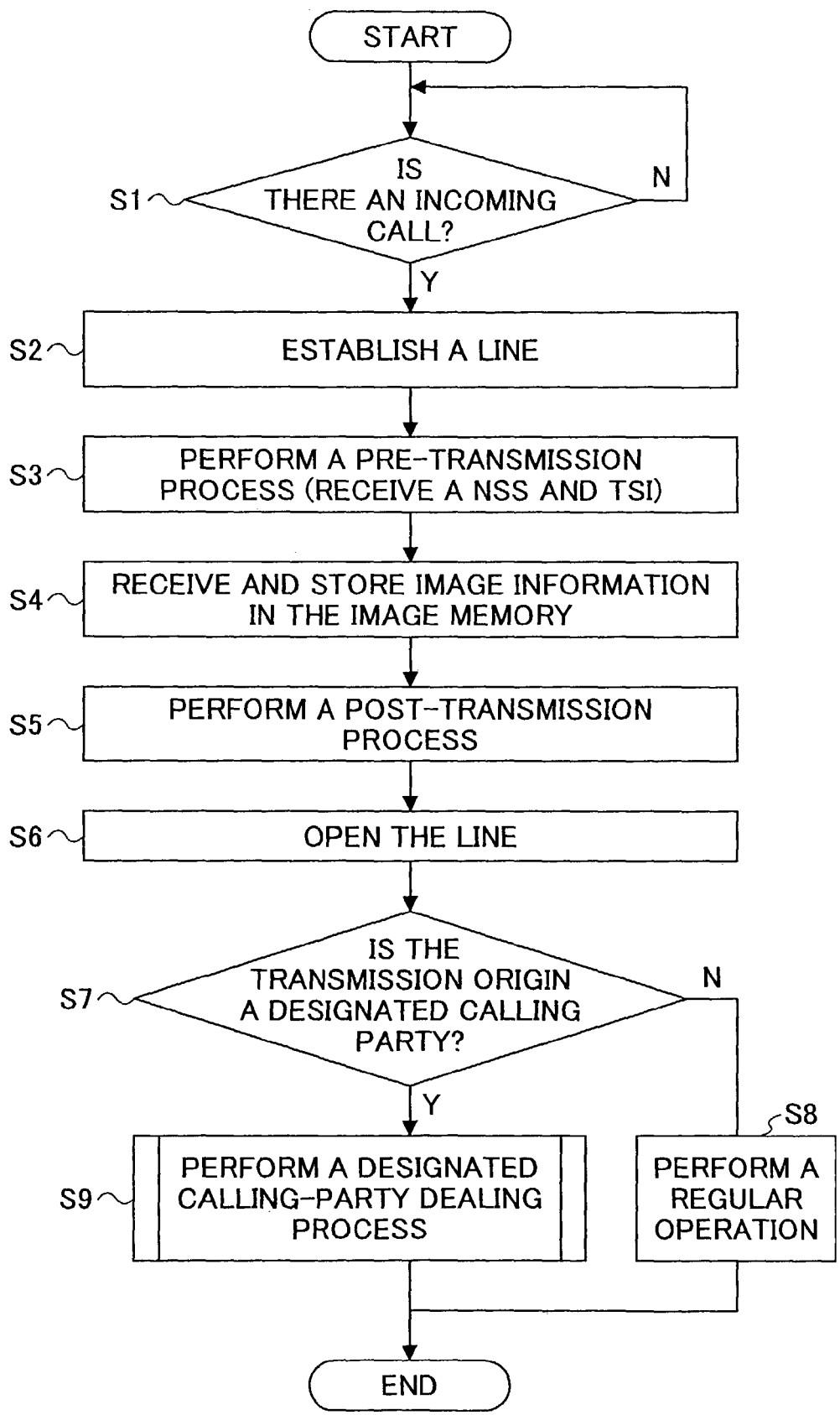
FIG. 4 is a flowchart of a receiving operation in accordance with the first embodiment.

Referring now to FIG. 4, a receiving process controlled by the CPU 31 of the above facsimile apparatus will be described. First, the conditions of the network control unit 40 are monitored to detect an incoming call from the public network 41 (step S1). If there is an incoming call ("Y" in step S1), the direct-current loop of the line is closed, and a line with the transmitter of the other end is established (step S2). A pre-transmission process is then performed in accordance with the G3-type facsimile protocols (step S3). In this pre-transmission process, the ability of standard and non-standard communication of the facsimile apparatus and the non-standard information of the facsimile apparatus are reported to the other end by means of a digital identifying signal DIS and a non-standard function identifying signal NSF. The telephone number of the facsimile apparatus is also reported to the other end by means of a called terminal identifying signal CSI. Meanwhile, the standard and non-standard communication functions are set by means of a digital transmission command signal DCS and a non-standard function setting signal NSS sent from the other end, and the non-standard information (that may contain the calling-party information such as the division name or the section name of the other end in a case where the device of the other end is of the same manufacturer) is reported from the other end. Also, the telephone number of the other end is reported as the calling-party information by means of a transmission terminal identifying signal TSI. A training check signal TCF is received at a modem speed set by the transmission end, and a reception preparation confirming signal CFR is returned.

After step S3, encoded image information transmitted as a facsimile message from the other end is received and temporarily stored in the image memory 37 (step S4). A post-transmission process is performed in accordance with the G3-type facsimile protocols (step S5), and the line direct-current loop is then opened (step S6). After the facsimile receiving process is completed, it is determined whether the calling-party information received by means of the non-standard function setting signal NSS or the transmission terminal identifying signal TSI in the pre-transmission process in step S3 has already been registered in the designated calling-party printing color registration table 34 (shown in FIG. 3) stored in the RAM 33 (step S7). If the calling-parry information has not been registered ("N" in step S7), a regular operation is performed (step S8). If the calling-party information has been registered ("Y" in step S7), a designated calling-party dealing process is performed (step S9). The procedure of step S7 is carried out as transmitter determining means or a transmitter determining function that determines whether the transmitter is a designated calling party registered in the designated calling-party printing color registration table 34, based on the calling-parry information accompanying the received image information.

More specifically, the regular operation of step S8 is an operation of performing reception printing using only the developing device 14K for developing the black (K) toner that is set as the default printing color.

Figure 5:
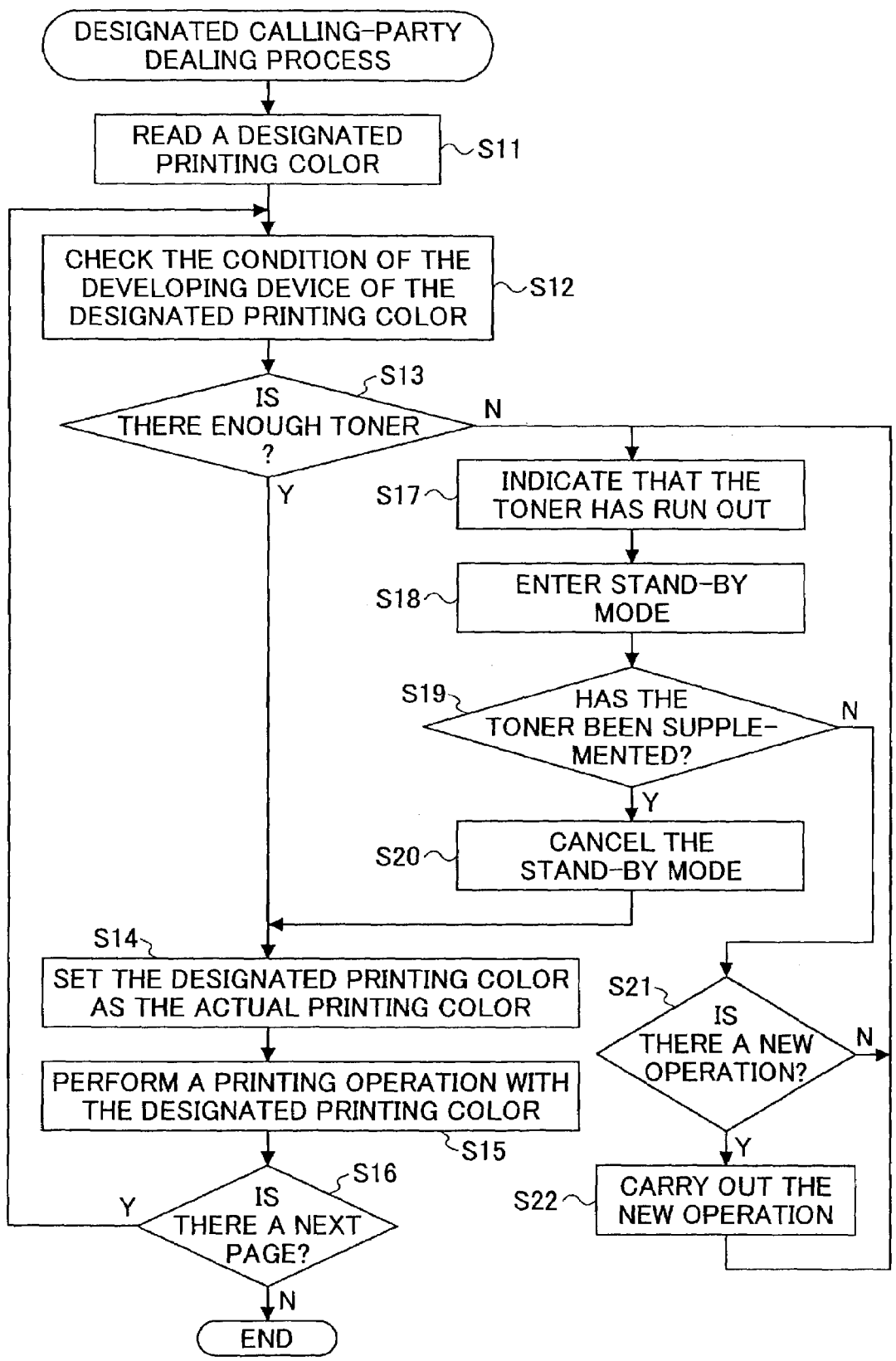
FIG. 5 is a flowchart of a designated calling-party dealing process in accordance with the first embodiment.

Referring now to FIG. 5, the designated calling-party dealing process of step S9 will be described. First, when there is an incoming call from a designated calling party registered beforehand by a user, the designated calling-party printing color registration table 34 is searched, and the printing color (the designated printing color) associated with the designated calling party is read out (step S11). In accordance with the sensor output of the developing device 14 corresponding to the read printing color, it is determined whether printing and outputting in the printing color is possible (step S12). If the toner of the printing color has not run out ("Y" in step S13), the read printing color is designated as the printing color at the time of reception printing (step S14), and the printer 2 prints the received image in the designated printing color using the received image data read from the image memory 37 and the developing device 14 corresponding to the designated printing color (step S15). The procedure or step S15 is carried on as designated color printing means or a designated color printing function.

If the designated calling party is "AA corporation" shown in FIG. 3, the magenta developing device 14M is used to print and output a received document in magenta. Accordingly, it is very easy to distinguish the received document from any other received document that is printed with the black toner for a non-designated party. Particularly, since different printing colors are used for the different designated calling parties in this embodiment, it is also possible to distinguish the designated calling parties from one another.

After the procedure of step S15, it is determined whether next-page printing is necessary (step S16). If there is a next page ("Y" in step S16), the condition of the corresponding developing device 14 is checked.

On the other hand, if the toner of the designated printing color has run out, and the corresponding developing device 14 cannot perform printing ("N" in step S13), the display device of the operation display unit 35 indicates that the toner has run out (step S17), so as to prompt users to supplement (replenish) the toner of the designated printing color. The operation enters a stand-by mode, and remains in the stand-by mode until the toner is supplemented (step S18). When the toner of the designated printing color is supplemented ("Y" in step S19), the stand-by mode is cancelled (step S20), and the procedures of steps S14 and S15 are repeated. More specifically, a read printing color is designated as the printing color for the reception printing (step S14), and the printer 2 prints a received document in the designated printing color, using the received image data read from the image memory 37 and the developing device 14 corresponding to the designated printing color (step S15). The procedures of steps S17 through S20 are carried out as intermission stand-by processing means or an intermission stand-by processing function.

In a case where printing cannot be performed with a designated printing color because the toner of the designated printing color has run out, the display unit of this embodiment indicates the suspension of the printing. The operation enters the stand-by mode, and remains in the stand-by mode until the designated color printing can be restarted. In such a case, a received document cannot be immediately obtained, but the printing of each received document of the designated calling party can be clearly distinguished from any other document received from undesignated calling parties.

In this embodiment, a document received from an undesignated calling party can be printed, even when the designated color toners have run out. In the stand-by mode, if there is a new operation such as an operation of receiving a document from another calling party ("Y" in step S21), the new operation is performed (step S22). Accordingly, the operation of the facsimile apparatus continues despite the designated color toner shortage.

Referring now to FIGS. 6 through 9, a second embodiment of the present invention will be described. In FIGS. 6 through 9, the same components as those of the first embodiment are denoted by the same reference numerals as the corresponding ones in FIGS. 1 through 5, and explanation of those components will be omitted in the following description. This also applies to a third embodiment that will be described later.

In this embodiment, a substitute color is used for printing, when printing cannot be performed with a designated printing color for a document received from a designated calling party. Therefore, the designated calling-party printing color registration table 34 of this embodiment contains designated substitute colors, as well as the names of designated calling parties, calling-party information, and designated printing colors, as shown in FIG. 6. The contents of the designated calling-party printing color registration table 34 are registered based on user setting. Each of the substitute printing colors is also registered beforehand by a user inputting through the operation display unit 35. Since the designation of substitute printing colors is optional, there might be no designated substitute printing colors if users do not register any substitute printing color. Here, substitute printing color setting means or a substitute printing color setting function that can set different substitute printing colors for different designated calling parties in the designated calling-party printing color registration table 34 is realized. In the designated calling-party printing color registration table 34, users can also set substitute color marks each indicating that the printing has been performed using a substitute color instead of the designated printing color to be used for the received document. A substitute color mark 51, for example, may be added to the upper right hand side on a recording paper sheet 52, as shown in FIG. 7. The substitute color mark 51 indicates that a substitute color has been used instead of the designated color. The image data of the substitute color mark 51 are stored as a template beforehand in the image memory 37. The substitute color mark 51 may take any form, as long as it is clear to users that a substitute printing color has been used instead of the designated printing color.

Figure 8:
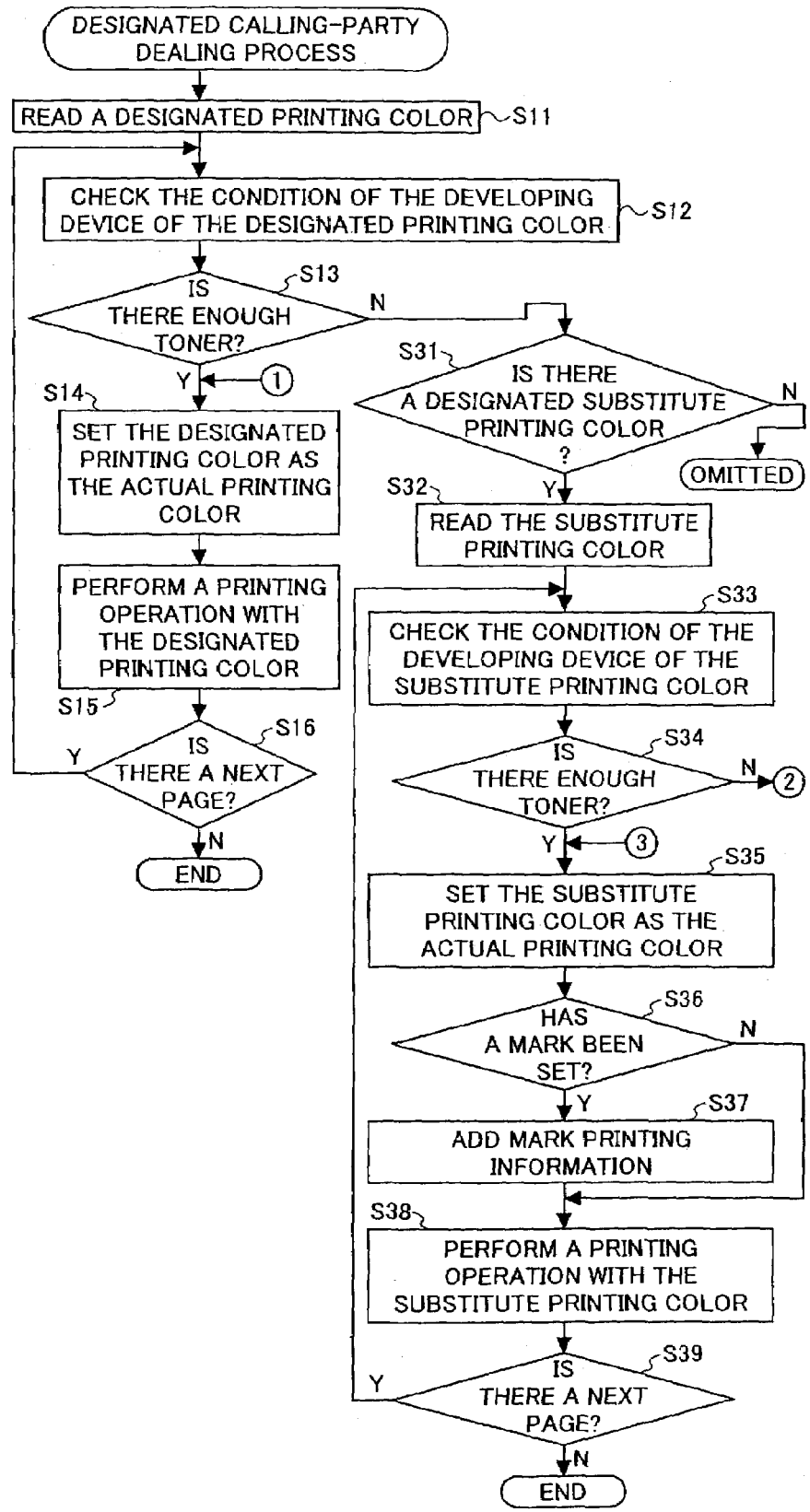
FIG. 8 is a flowchart of a part of the designated calling-party dealing process in accordance with the second embodiment.
Figure 9:
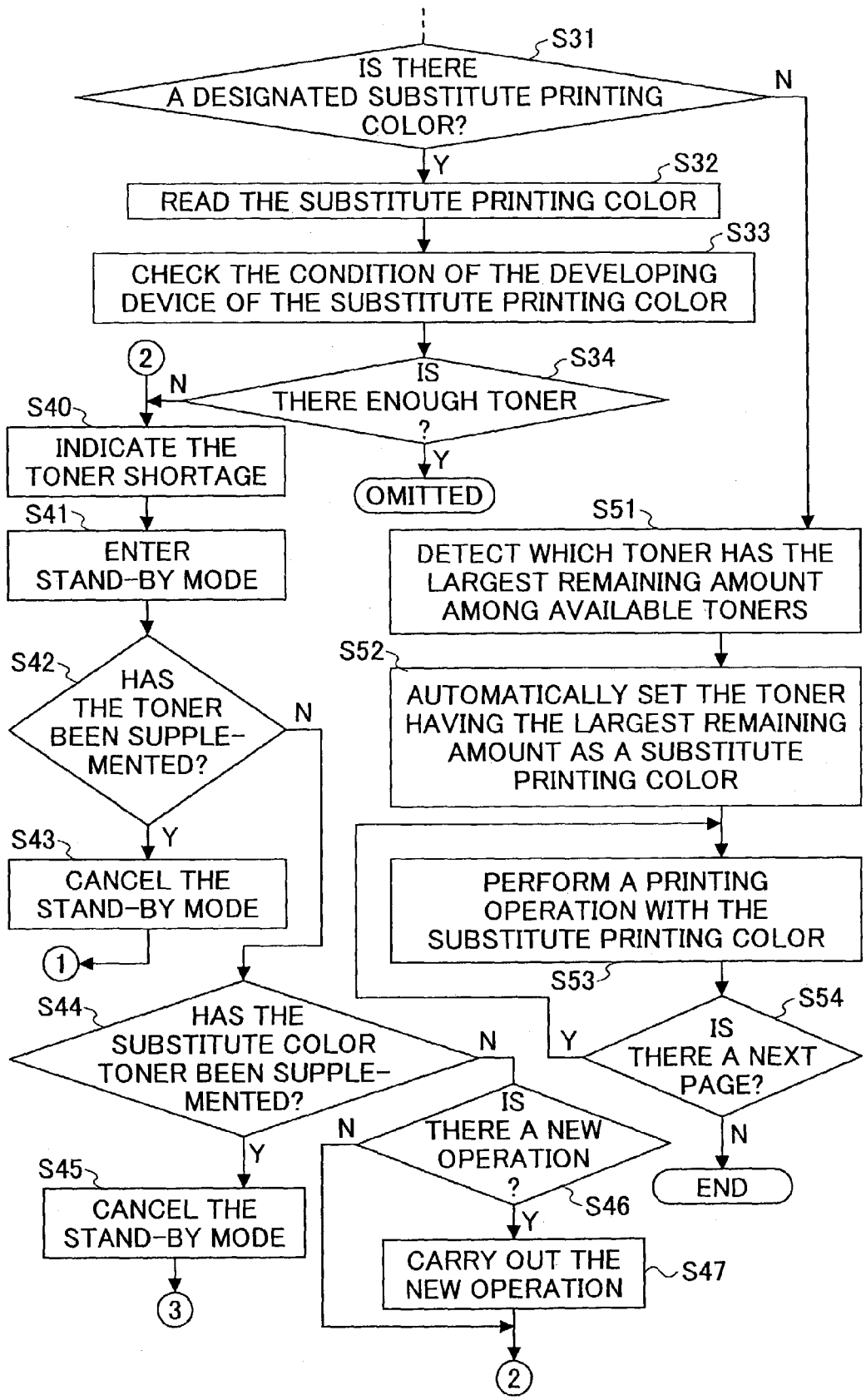
FIG. 9 is a flowchart of the remaining part of the designated calling-party dealing process in accordance with the second embodiment.

Referring now to FIGS. 8 and 9, the designated calling-party dealing process of this embodiment will be described.

This process is basically the same as the process shown in FIG. 5. More specifically, when there is an incoming call from a designated calling party that has been registered by a user beforehand, the printing color (the designated printing color) associated with the designated calling party is read out (step S11). It is determined whether printing can be performed with the read printing color (step S12). If the toner of the read printing color has not run out ("Y" in step S13), the read printing color is designated as the printing color for reception printing (step S14). The printer 2 then prints the received image in the designated printing color, using the received image data read from the image memory 37 and the developing device 14 corresponding to the designated printing color (step S15).

On the other hand, if the toner of the read printing color has run out ("N" in step S13), the designated calling-party printing color registration table 34 is searched to determine whether a substitute printing color associated with the designated calling party has been registered by a user (step S31). If there is a substitute printing color registered by a user ("Y" in step S31), the substitute printing color is read from the designated calling-party printing color registration table 34 (step S32). The sensor output of the developing device 14 corresponding to the substitute printing color is used to determine whether printing can be performed with the substitute printing color (step S33). If the toner of the substitute printing color has not run out ("Y" in step S34), the substitute printing color is designated as the printing color for reception printing (step S35). The printer 2 then prints the received image in the substitute printing color, using the received image data read from the image memory 37 and the developing device 14 corresponding to the substitute printing color (step S38). Substitute color printing means or a substitute color printing function is realized through the procedure of step S38. Prior to the printing with the substitute printing color, the designated calling-party printing color registration table 34 is searched to determine whether there is a substitute color mark associated with the designated calling party (step S36). If there is a substitute color mark associated with the designated calling party ("Y" in step S36), the image data of the substitute color mark are set in a position in which the received image data have been set beforehand (step S37), and the operation moves on to printing with the substitute printing color (step S38). Substitute printing information adding means or a substitute printing information adding function is realized through the procedure of step S37. After the procedure of step S38, it is determined whether next-page printing is necessary (step S39). If there is a next page ("Y" in step S39), the operation returns to the checking of the corresponding developing device 14 (step S33).

As described above, printing might not be possible with a designated printing color because the toner of the designated printing color has run out. In such a case, printing is performed with a substitute printing color instead of the designated printing color. Thus, print output can be always obtained, and a delay of print output can be prevented. In a case where "AA corporation" shown in FIG. 6 is the designated calling party, for example, the designated printing color is magenta. If the magenta toner has run out, the developing device 14K for black as a substitute printing color is used to print the received document with the black toner. To obtain the second best printing output, the substitute printing color set by a user is used. Thus, the requirements of the user can be optimally met.

In a case where printing is performed with a substitute printing color instead of a designated printing color, the recipient user might not recognize that the document has been sent from a designated calling party. However, with the substitute color mark 51 shown in FIG. 7 added as additional information indicating that the printing has been performed with the substitute color instead of the designated printing color, it is easy for the recipient user to recognize that the document printed with the substitute printing color has been sent from a designated calling party. In a case where printing cannot be performed with a designated printing color due to shortage of the corresponding color toner, the user might give priority to the printing over clearly distinguishing between a designated calling party and an undesignated calling party. If there are no substitute color marks set by users, the substitute color marks 51 are not printed. Thus, printing operations according to user settings can be performed.

If the toner of a substitute printing color has also run out ("N" in step S34), the display device of the operation display unit 35 indicates that the toner has run out (step S40). This indication prompts users to supplement the toner of the designated printing color and the toner of the substitute printing color, and the operation enters a stand-by mode, and remains in the stand-by mode until either or the toners is supplemented (steps S41 through S44). When the toner of the designated printing color or the toner of the substitute printing color is supplemented ("Y" in step S42 or S44, respectively), the stand-by mode is cancelled (step S43 or S45), and the operation returns to steps S14 and 15 or steps S35 and 38, respectively.

Even if the toners of a designated printing color and the corresponding substitute printing color for a designated calling party have run out, an operation of receiving a document from an undesignated calling party can be performed. In the stand-by mode, if there is a new operation such as an operation of receiving a document from another party ("Y" in step S46), the new operation is performed (step S47). Accordingly, the operation of the facsimile apparatus is not stopped due to the shortage of the toners of the designated printing color and the substitute printing color.

Meanwhile, if the toner of the designated printing color has run out ("N" in step S13), it is determined whether there is a substitute color printing set by a user (step S31). If there are no substitute printing colors set by users ("N" in step S31), the sensor output of each developing device 14 is used to detect which color toner has the greatest remaining amount that can be used for printing (step S51). In a case where "YZ Corporation" in FIG. 6 is the designated calling party, for example, the designated printing color is cyan. If the cyan toner has run out, the remaining amounts of the black toner and the magenta toner (the yellow toner is not used in this case) are measured to determine which color toner has the greatest remaining amount. The toner having the greatest remaining amount is automatically designated as the substitute printing color (step S52). The printer 2 then prints the received image with the substitute printing color, using the received image data read from the image memory 37 and the developing device 14 of the designated substitute printing color (step S53). Automatic substitute printing color setting means or an automatic substitute printing color setting function is realized through the procedures of steps of S51 and S52. Substitute color printing means or a substitute color printing function is realized through the procedure of step S53. After step S53, it is determined whether next-page printing is necessary (step S54). If there is a next page ("Y" in step S54), the printing process is repeated. In this case, the remaining toner amount is not checked, as the toner having the greatest remaining amount has been selected.

As described above, in a case where the printer 2 cannot perform printing with a designated printing color due to shortage of the corresponding color toner, the toner having the greatest remaining amount is automatically set as a substitute printing color. Thus, printing can be always performed with a substitute printing color in a case where print output is given priority over printing with a designated printing color.

Referring now to FIG. 10, the third embodiment of the present invention will be described. In this embodiment, if a substitute color has not been set by users, a printing color that has been set as the default printing color is set as a substitute color.

More specifically, in a case where the toner of the designated printing color has run out ("N" in step S13), if there are no substitute printing colors set by users ("N" in step S31), a printing color that has been set as the default printing color (black (K), for example) is used as a substitute printing color, and the default printing color is read out (step S61). The condition of the developing device 14 of the default printing color is then checked (step S62). If the toner of the default printing color has not run out ("Y" in step S63), the read default printing color is designated as the substitute printing color for reception printing (step S64). The printer 2 then prints the received image with the designated substitute printing color, using the received image data read from the image memory 37 and the developing device 14 of the designated substitute printing color (step S65). Substitute printing color setting means or a substitute printing color setting function is realized through the procedure of step S64, and substitute color printing means or a substitute color printing function is realized through the procedure of step S65.

After step S65, it is determined whether next-page printing is necessary (step S66). If there is a next page ("YES" in step S66), the operation returns to the checking of the condition of the corresponding developing device 14 (step S62).

If the toner of the substitute printing color has run out ("N" in step S63), the display device of the operation display unit 35 indicates that the toner has run out (step S67). This prompts users to supplement the toner of the designated printing color or the toner of the substitute printing color. The operation enters a print stand-by mode, and remains in the stand-by mode until the toner is supplemented (steps S68 through S71). When the toner of the designated printing color or the toner of the substitute printing color is supplemented ("Y" in step S69 or S71), the stand-by mode is cancelled (step S70 or S72), and the operation returns to steps S14 and S15 or steps S64 and S65.

As described above, in a case where printing cannot be performed with a designated printing color due to shortage of the corresponding color toner, if there are no substitute colors set by users, the default printing color set in the initializing process is set as a substitute printing color. Thus, the most general printing color can be set as a substitute printing color.

Even in a case where the toners of a designated printing color and its substitute printing color have run out, reception printing can be performed if the incoming call originates from an undesignated calling party. In the stand-by mode, if there is a new operation such as an operation of receiving a document from another calling party ("YES" in step S73), the new operation is carried out (step S74). Accordingly, the operation of the facsimile apparatus is not stopped due to the shortage of the toners of the designated printing color and the substitute printing color.

Although the foregoing embodiments of the present invention are applied to G3-type facsimile apparatuses connected to public networks in the above description, it is also possible to apply any of the foregoing embodiments to a facsimile apparatus that transmits and receives image information in accordance with other transmission control procedures, such as a G4-type facsimile device connected to an ISDN.

In each of the foregoing embodiments, a full-color printer is used to perform single-color printing using a designated printing color or a substitute printing color. However, in a case where a larger number of designated printing colors are required, a printing color that is the mixture of two or more color toners can be used. Also, the printer 2 is not limited to the structure of FIG. 2, but may be a tandem-type full-color printer, for example. Further, the printing technique is not limited to an electrophotography technique, but may be an ink-jet printing technique.

It should be noted that the present invention is not limited to the embodiments specifically disclosed above, but other variations and modifications may be made without departing from the scope of the present invention.

The present application is based on Japanese priority application No. 2002-187710 filed on Jun. 27, 2002 with the Japanese Patent Office, the entire contents of which are hereby incorporated by reference.

What is claimed is:

1. A facsimile apparatus comprising:
 a printer that has a plurality of printing colors;
 a designated calling-party printing color storage unit that stores calling-party information as to designated calling parties each associated with a designated printing color different from a default printing color;
 a transmission origin determiner that determines whether the transmission origin of image information received in a receiving operation is one of the designated calling parties stored in the designated calling-party printing color storage unit, based on calling-party information accompanying the image information;
 a designated color printing control unit that causes the printer to print the image information using the corresponding designated printing color stored in the designated calling-party printing color storage unit, when the transmitter origin determiner determines that the transmission origin of the image information is one of the designated calling parties;
 a substitute printing color setting unit configured to set different substitute printing colors for the respective designated calling parties registered in the designated calling-party printing color storage unit,
 wherein the different substitute printing colors for the respective designated calling parties are set by a user through said substitute printing color setting unit; and
 a substitute printing unit that causes the printer to print the image information with a substitute printing color instead of the designated printing color, when the printing cannot be performed with the designated printing color associated with the transmitter origin that has been determined to be one of the designated calling parties by the transmitter origin determiner.

2. The facsimile apparatus as claimed in claim 1, further comprising an automatic substitute printing color setting unit that automatically sets a substitute printing color for the transmission origin determined to be one of the designated calling parties, when the transmission origin does not have a substitute printing color set by a user.

3. The facsimile apparatus as claimed in claim 2, wherein the automatic substitute printing color setting unit determines which printing color agent has the greatest remaining amount among available printing agents, and automatically sets the printing color corresponding to the printing color agent having the greatest remaining amount as a substitute printing color.

4. The facsimile apparatus as claimed in claim 1, wherein the default printing color that has been set in an initializing process is used as a substitute printing color, when the transmission origin determined to be one of the designated calling parties does not have a substitute printing color set by a user through the substitute printing color setting unit.

5. The facsimile apparatus as claimed in claim 1, further comprising a substitute printing information adding unit that prints a substitute printing remark indicating that the printing has been performed with a substitute printing color instead of the corresponding designated printing color, when the substitute color printing unit performs substitute color printing.

6. The facsimile apparatus as claimed in claim 5, wherein the addition of the substitute printing remark by the substitute printing information adding unit is optional.

7. The facsimile apparatus as claimed in claim 1, further comprising:
 a designated printing color setting unit configured to set different designated printing colors for respective designated calling parties registered in said designated calling-party printing color storage unit.

8. The facsimile apparatus as claimed in claim 1, wherein the designated printing color with which the image information received from a designated calling party whose calling-party information is stored in said designated calling-party printing color storage unit is printed is different from a default color with which image information received from an undesignated calling party is printed.

9. A facsimile apparatus comprising:
 means for storing calling-party information as to designated calling parties each associated with a designated printing color different from a default printing color;
 means for determining whether the transmission origin of image information received in a receiving operation is one of the designated calling parties, based on calling-party information accompanying the image information;
 means for causing a printer having a plurality of printing colors to print the image information with the corresponding designated printing color, when the transmission origin of the image information is determined to be one of the designated calling parties;
 setting means for setting different substitute printing colors for the respective designated calling parties,
 wherein the different substitute printing colors for the respective designated calling parties are set by a user through said setting means; and
 means, when the printing cannot be performed with the corresponding designated printing color associated with the transmission origin that is determined to be one of the designated calling parties, for causing the printer to print the image information with a substitute printing color instead of the corresponding designated printing color.

10. The facsimile apparatus as claimed in claim 9, further comprising means for automatically setting a substitute printing color, when the transmission origin determined to be one of the designated calling parties does not have a substitute printing color set by a user.

11. The facsimile apparatus as claimed in claim 10, wherein the means for automatically setting a substitute printing color determines which printing color agent has the greatest remaining amount among available printing color agents, and sets the printing color agent having the greatest remaining amount as a substitute printing color.

12. The facsimile apparatus as claimed in claim 9, wherein the default printing color set in an initializing process is used as a substitute printing color, when the transmission origin determined to be one of the designated calling parties does not have a substitute printing color set by a user.

13. The facsimile apparatus as claimed in claim 9, further comprising means for printing a substitute printing remark indicating that the printing has been performed with a substitute printing color instead of the corresponding designated printing color.

14. The facsimile apparatus as claimed in claim 13, wherein the addition of the substitute printing remark is optional.

15. A computer readable medium tangibly embodying a program of instructions executable by a computer provided in a facsimile apparatus that includes a printer having a plurality of printing colors and a designated calling-party printing color storage unit that stores calling-party information as to designated calling parties each associated with a designated printing color different from a default printing color, the program causing the computer to execute:
  a transmission origin determining function for determining whether the transmission origin of image information received in a receiving operation is one of the designated calling parties stored in the designated calling-party printing color storage unit, based on calling-party information accompanying the image information;
  a designated color printing function for causing the printer to print the image information with the corresponding designated printing color stored in the designated calling-party printing color storage unit, when the transmission origin is determined to be one of the designated calling parties through the transmission origin determining function;
  a substitute printing color setting function for setting different substitute printing colors for the respective designated calling parties registered in the designated calling-party printing color storage unit,
  wherein the different substitute printing colors for the respective designated calling parties are set by a user through said substitute printing color setting function; and
  a substitute color printing function for causing the printer to print the image information with a substitute printing color instead of the corresponding designated printing color, when the printing cannot be performed with the designated printing color corresponding to the transmission origin determined to be one of the designated calling parties through the transmission origin determining function.

16. The computer readable medium as claimed in claim 15, wherein the program further causes the computer to execute an automatic substitute printing color setting function for automatically setting a substitute printing color, when the transmission origin determined to be one of the designated calling parties does not have a substitute printing color set by a user.

17. The computer readable medium as claimed in claim 16, wherein the automatic substitute printing color setting function determines which printing color agent has the greatest remaining amount among available printing color agents, and automatically sets the printing color agent having the greatest remaining amount as a substitute printing color.

18. The computer readable medium as claimed in claim 15, wherein the default printing color that has been set in an initialing process is used as a substitute printing color for the transmission origin determined to be one of the designated calling parties, when the transmission origin does not have a substitute printing color set by a user through the substitute printing color setting function.

19. The computer readable medium as claimed in claim 15, wherein the program further causes the computer to execute a substitute printing information adding function for printing a substitute printing remark indicating that the printing has been performed with a substitute printing color instead of the corresponding designated printing color through the substitute color printing function.

20. The computer readable medium as claimed in claim 19, wherein the addition of the substitute printing remark through the substitute printing information adding function is optional.

21. A method of printing image information with a printer having a plurality of printing colors in a facsimile apparatus, comprising the steps of:
  storing calling-party information as to designated calling parties each associated with a designated printing color different from a default printing color;
  determining whether the transmission origin of the image information is one of the designated calling parties stored in the designated calling-party printing color storage unit, based on calling-party information accompanying the image information received in a receiving operation; and
  printing the image information with the printer using the corresponding designated printing color stored in the designated calling-party printing color storage unit, when the transmission origin of the image information is determined to be one of the designated calling parties;
  setting, by a user through a substitute printing color setting function of the facsimile apparatus, different substitute printing colors for the respective designated calling parties; and
  causing the printer to print the image information with a substitute printing color, set by the user, instead of the corresponding designated printing color, when the printing cannot be performed with the designated printing color corresponding to the transmission origin determined to be one of the designated calling parties.

* * * * *